United States Patent
Lin et al.

(10) Patent No.: US 11,115,642 B2
(45) Date of Patent: Sep. 7, 2021

(54) INTEGRATED VISION MODULE COMPONENT AND UNMANNED AERIAL VEHICLE

(71) Applicant: SZ DJI TECHNOLOGY CO., LTD., Shenzhen (CN)

(72) Inventors: Tao Lin, Shenzhen (CN); Tongyao Huang, Shenzhen (CN); Jiangang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/932,472

(22) Filed: Jul. 17, 2020

(65) Prior Publication Data
US 2020/0351487 A1 Nov. 5, 2020

Related U.S. Application Data

(63) Continuation of application No. PCT/CN2018/073475, filed on Jan. 19, 2018.

(51) Int. Cl.
| | |
|---|---|
| *H04N 13/243* | (2018.01) |
| *H04N 13/296* | (2018.01) |
| *H04N 5/225* | (2006.01) |
| *G03B 15/00* | (2021.01) |

(52) U.S. Cl.
CPC ......... *H04N 13/243* (2018.05); *G03B 15/006* (2013.01); *H04N 5/2253* (2013.01); *H04N 13/296* (2018.05); *H04N 2213/001* (2013.01)

(58) Field of Classification Search
CPC .. H04N 5/2252; H04N 5/2253; H04N 5/2257; H04N 5/2258; H04N 5/2254;
(Continued)

(56) References Cited

U.S. PATENT DOCUMENTS

| | | | |
|---|---|---|---|
| 9,830,713 B1 | 11/2017 | Walker | |
| 2004/0021792 A1* | 2/2004 | Yasui | H04N 7/142 348/373 |

(Continued)

FOREIGN PATENT DOCUMENTS

| | | |
|---|---|---|
| CN | 103916578 A | 7/2014 |
| CN | 105025657 A | 11/2015 |

(Continued)

OTHER PUBLICATIONS

English Translation of CN107223275A, Sep. 29, 2017.

(Continued)

*Primary Examiner* — Jayanti K Patel
*Assistant Examiner* — Christopher Kingsbury Glover
(74) *Attorney, Agent, or Firm* — Anova Law Group, PLLC (57) ABSTRACT

The present disclosure provides an integrated vision module component. The integrated vision module includes a bracket, a first vision module, and a second vision module. The first vision module and the second vision module are mounted on the bracket. The first vision module includes a first flexible circuit board, and a first image sensor and a second image sensor mounted on the first flexible circuit board. The second vision module includes a second flexible circuit board, and a third image sensor and a fourth image sensor mounted on the second flexible circuit board. The first image sensor and the third image sensor form a first binocular vision sensor. The second image sensor and the fourth image sensor form a second binocular vision sensor.

16 Claims, 6 Drawing Sheets

(58) Field of Classification Search
CPC ........... H04N 13/243; H04N 2213/001; H05K 2201/10121; H05K 1/028; H05K 1/189; H05K 1/14; H05K 1/147
See application file for complete search history.

(56) References Cited

U.S. PATENT DOCUMENTS

| | | | |
|---|---|---|---|
| 2014/0118353 A1* | 5/2014 | Ha | G06T 15/506 345/426 |
| 2018/0138617 A1* | 5/2018 | Lukofsky | H01R 12/78 |
| 2018/0176435 A1* | 6/2018 | Wei | H05K 1/028 |

FOREIGN PATENT DOCUMENTS

| | | |
|---|---|---|
| CN | 106287134 A | 1/2017 |
| CN | 106791336 A | 5/2017 |
| CN | 106907993 A | 6/2017 |
| CN | 206226569 U | 6/2017 |
| CN | 107065926 A | 8/2017 |
| CN | 107077145 A | 8/2017 |
| CN | 107105217 A | 8/2017 |
| CN | 107223275 A | 9/2017 |
| CN | 206502039 U | 9/2017 |
| WO | 2016012790 A1 | 1/2016 |

OTHER PUBLICATIONS

The World Intellectual Property Organization (WIPO) International Search Report for PCT/CN2018/073475 dated Oct. 17, 2018 6 pages.

* cited by examiner

INTEGRATED VISION MODULE COMPONENT AND UNMANNED AERIAL VEHICLE

CROSS-REFERENCE TO RELATED APPLICATION

This application is a continuation of International Application No. PCT/CN2018/073475, filed on Jan. 19, 2018, the entire content of which is incorporated herein by reference.

TECHNICAL FIELD

The present disclosure relates to the field of visual information collection and, more specifically, to an integrated vision module component an unmanned aerial vehicle (UAV).

BACKGROUND

At present, computer vision technology is widely applied to various electronic devices, such as in UAVs, sweeping robots, etc. With the needs to integrate and minimize the computer vision devices, computer vision modules need to meet the requirements of miniaturization, simple structural design, and being convenient and reliable to assemble. The electronic devices in conventional technology, especially the devices with multi-directional computer vision, use vision modules that are generally bulky, have complicated structural designs, and are often difficult to assemble.

SUMMARY

One aspect of the present disclosure provides an integrated vision module component. The integrated vision module includes a bracket, a first vision module, and a second vision module. The first vision module and the second vision module are mounted on the bracket. The first vision module includes a first flexible circuit board, and a first image sensor and a second image sensor mounted on the first flexible circuit board. The second vision module includes a second flexible circuit board, and a third image sensor and a fourth image sensor mounted on the second flexible circuit board. The first image sensor and the third image sensor form a first binocular vision sensor. The second image sensor and the fourth image sensor form a second binocular vision sensor.

Another aspect of the present disclosure provides an UAV. The UAV includes a body, and an integrated vision module component mounted on the body. The integrated vision module component includes a bracket, a first vision module, and a second vision module. The first vision module and the second vision module are mounted on the bracket. The first vision module includes a first flexible circuit board, and a first image sensor and a second image sensor mounted on the first flexible circuit board. The second vision module includes a second flexible circuit board, and a third image sensor and a fourth image sensor mounted on the second flexible circuit board. The first image sensor and the third image sensor form a first binocular vision sensor; and the second image sensor and the fourth image sensor form a second binocular vision sensor.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

REFERENCE NUMERALS

| | |
|---|---|
| 10 | Integrated vision module component |
| 11 | First vision module |
| 111 | First flexible circuit board |
| 1112 | First segment |
| 1114 | Second segment |
| 1116 | Third segment |
| 112 | First image sensor |
| 113 | First lens |
| 1131 | First lens glass |
| 1132 | First lens barrel |
| 1133 | First lens holder |
| 1134 | First notch |
| 114 | Second image sensor |
| 115 | Second lens |
| 116 | First connector |
| 12 | Second vision module |
| 121 | Second flexible circuit board |
| 1212 | Fourth segment |
| 1214 | Fifth segment |
| 1216 | Sixth segment |
| 122 | Third image sensor |
| 123 | Third lens |
| 1231 | Third lens glass |
| 1232 | Third lens barrel |
| 1233 | Third lens holder |
| 1234 | Third notch |
| 124 | Fourth image sensor |
| 125 | Fourth lens |
| 126 | Second connector |
| 13 | Time-of-flight ranging module |
| 132 | Transmitter |
| 134 | Receiver |
| 136 | Main board |
| 14 | Bracket |
| 142 | Body |
| 1422 | First board |
| 1424 | Second board |
| 144 | Lead-out portion |
| 1442 | Mounting groove |
| 1444 | Second positioning structure |
| 15 | Third flexible circuit board |
| 152 | First positioning structure |
| 154 | Third connector |
| 16 | Control button |
| 17 | Indicator light |

-continued

| 18 | Conductive foam |
| 19 | Mounting portion |
| 20 | Body |
| 21 | First through hole |
| 22 | Second through hole |
| 23 | Third through hole |
| 24 | Fourth through hole |
| 25 | Light cover |
| 26 | Receiving groove |
| 262 | Sidewall |
| 2622 | Lower sidewall |
| 2624 | Rear sidewall |
| 27 | Fifth through hole |
| 28 | Sixth through hole |
| 40 | Arm |
| 60 | Power assembly |
| 100 | UAV |

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, when terms such as "center," "longitudinal," "lateral," "length," "width," "thickness," "above," "upper," "below," "lower," "back," "left," "right," "vertical," "horizontal," "top," "bottom," "inside," "outside," "internal," "external," "clockwise," "counter-clockwise" are used to indicate orientational or positional relationship that is based on the orientation or positional relationship as shown in the drawings, it is for the convenience of describing various embodiments and for the simplification of the descriptions. Such terms do not indicate or imply a related device or element necessarily has the specified orientation, or is structurally configured in the specified orientation or is operated in the specified orientation. Thus, these terms are for illustrative purposes only and are not intended to limit the scope of the present disclosure. It should be understood that in the present disclosure, relational terms such as first and second, etc., are only used to distinguish an entity or operation from another entity or operation, and do not necessarily imply that there is an actual relationship or order between the entities or operations. Therefore, a "first" or "second" feature may include, explicitly or implicitly, one or more such features. The term "multiple" means two or more than two, unless otherwise defined.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component.

In the present disclosure, unless otherwise explicitly defined, when a first feature is described as being disposed on or below a second feature, the first feature and the second feature may directly contact one another, or may not directly contact one another. In some embodiments, the first feature may indirectly contact the second feature through one or more other features. When a first feature is described as being disposed "at" a second feature, the first feature may be disposed at any suitable position and/or orientation relative to the second feature, such as in the second feature, on the second feature, below the second feature, connected to the second feature from a side, etc. When a first feature is described as being disposed "above," or "over," "below," or "under" the second feature, the positional configuration includes the first feature being right above or over the second feature, being right below or under the second feature, being above or over the second feature at any location other than being right above or over the second feature, and being blow or under the second feature at any location other than being right below or under the second feature. The terms "above," "over," "below," or "under" may also be used to only indicate that the first feature is located higher or lower than the second feature relative to a horizontal reference plane.

The following describe various embodiments or examples for realizing various structures of the present disclosure. For simplicity, only some example devices and configurations are described below. These descriptions are for illustrative purposes only, and are not intended to limit the scope of the present disclosure. In addition, the same reference numbers or characters may be used in various embodiments in the drawings. The repeated use of the same reference numbers or characters is only for simplification and clarity purposes. It does not necessarily indicate any relationship between various embodiments or configurations. The present disclosure also provides examples of manufacturing processes and/or materials. A person having ordinary skill in the art can appreciate that other suitable processes and/or materials may also be used.

Figure 1:
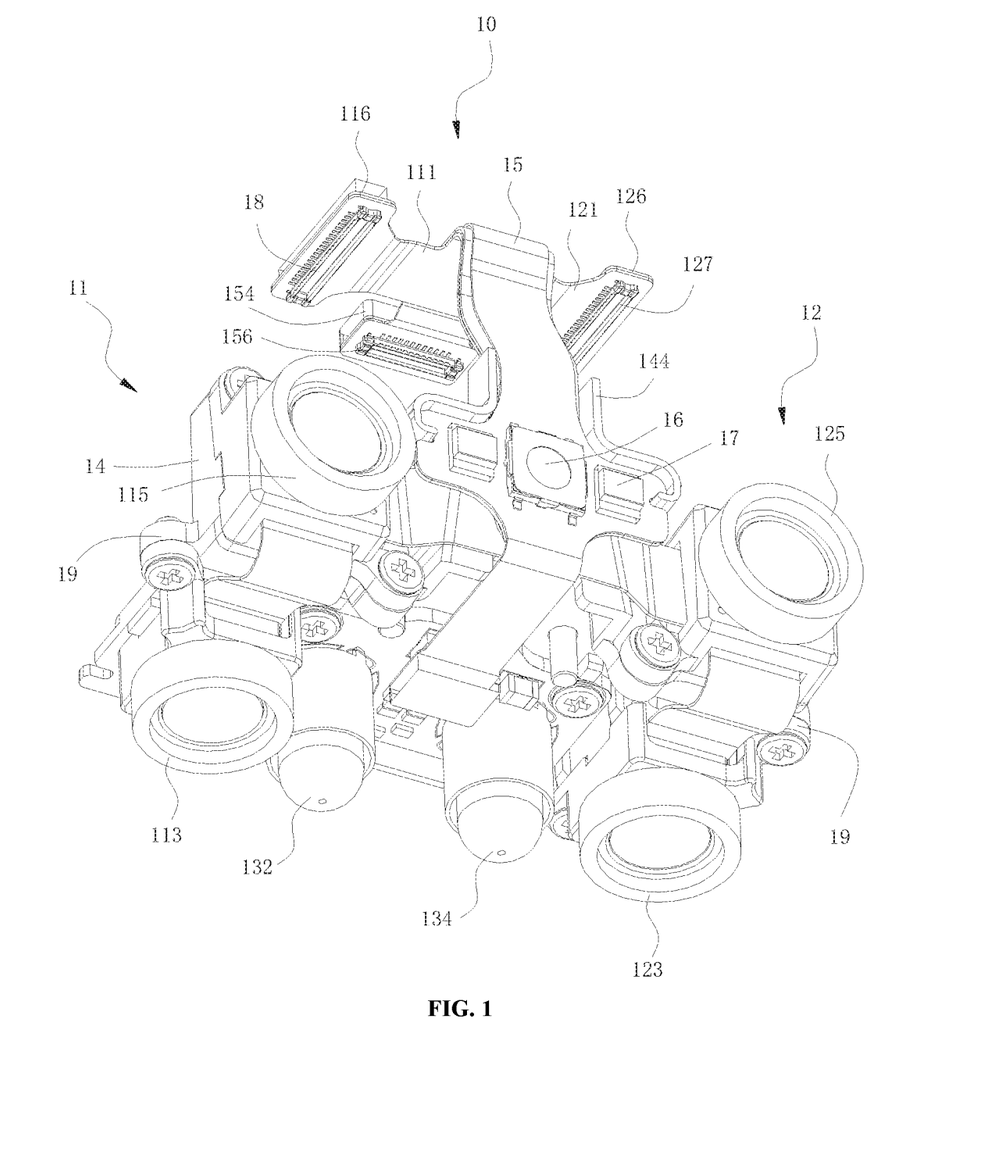
FIG. 1 is a perspective view of an integrated vision module component according to an embodiment of the present disclosure.
Figure 2:
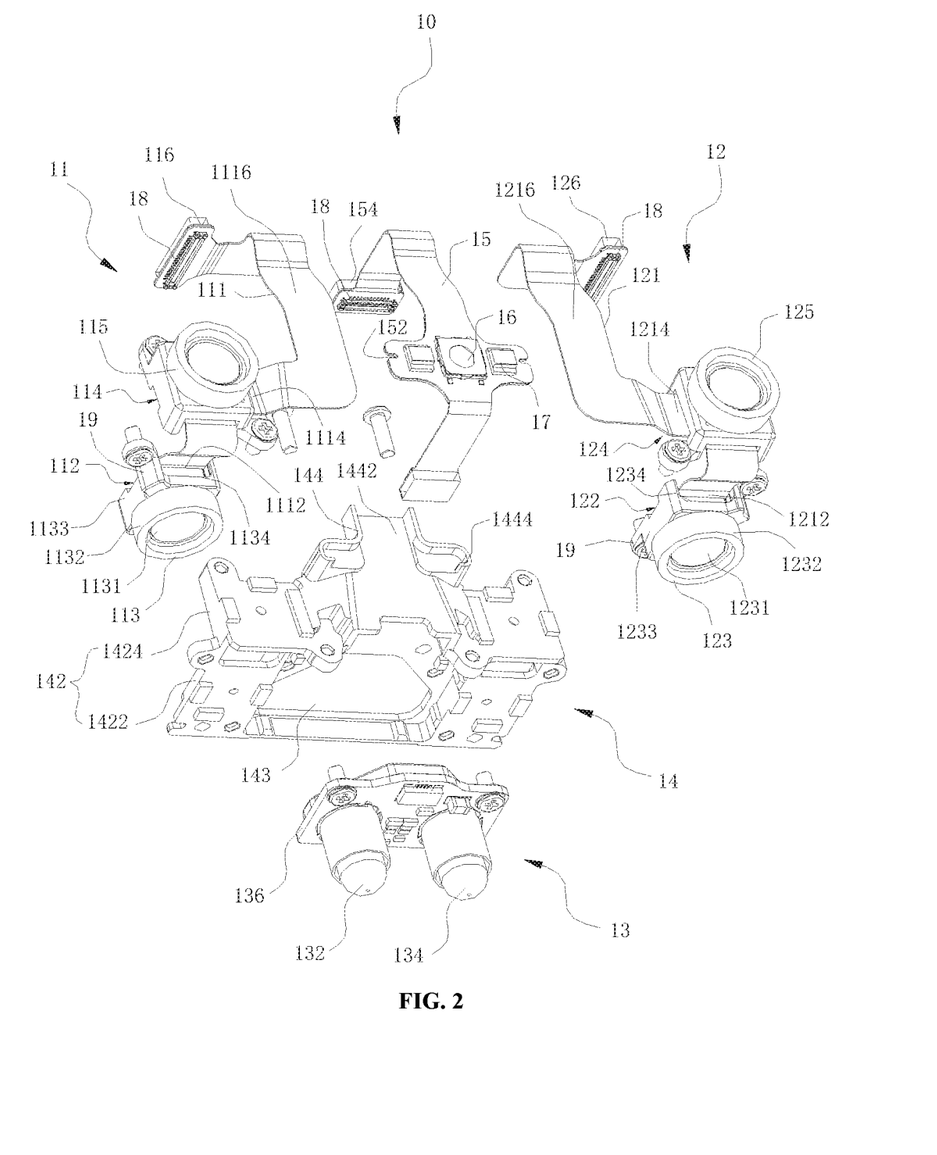
FIG. 2 is a three-dimensional (3D) exploded view of the integrated vision module component according to an embodiment of the present disclosure.

Referring to FIGS. 1 and 2. An embodiment of the present disclosure provides an integrated vision module component 10. The integrated vision module component 10 may include a bracket 14, a first vision module 11, and a second vision module 12. The first vision module 11 and the second vision module 12 are mounted on the bracket 14. The first vision module 11 may include a first flexible circuit board 111, and a first image sensor 112 and a second image sensor mounted on the first flexible circuit board 111. The second vision module 12 may include a second flexible circuit board 121, and a third image sensor 122 and a fourth image sensor 124 mounted on the second flexible circuit board 121. The first image sensor 112 and the third image sensor 122 may form a first binocular vision sensor, and the second image sensor 114 and the fourth image sensor 124 may form a second binocular vision sensor.

In the integrated vision module component 10 described above, the first vision module 11 and the second vision module 12 may be mounted on the bracket 14 and integrated into an integrated vision module component 10. When the integrated vision module component 10 is mounted on an electronic device, a multi-direction module can be realized. As such, the space occupied by the integrated vision module component 10 in the electronic device may be reduced, the structural design of the electronic device may be simplified, and the assembly may be relatively simple and reliable.

More specifically, in the design stage of the flexible circuit board of the vision module, two or more image sensors may be designed on a flexible circuit board. When assembling the integrated vision module component 10, the first image sensor 112 and the second image sensor 114 may be mounted on the first flexible circuit board 111, and the third image sensor 122 and the fourth image sensor 124 may be mounted on the second flexible circuit board 121. Subsequently, the first flexible circuit board 111 with the first image sensor 112 and the second image sensor 114 and the second flexible circuit board 121 with the third image sensor 122 and the fourth image sensor 124 may be mounted at a predetermined position of the bracket 14. There may be overlaps when the first flexible circuit board 111 and the second flexible circuit board 121 are mounted on the bracket 14. For example, the second flexible circuit board 121 may partially cover the first flexible circuit board 111 to reduce the space occupied by the first flexible circuit board 111 and the second flexible circuit board 121.

In some embodiments, the first image sensor 112 may be the lower left sensor of the integrated vision module component 10, the second image sensor 114 may be the rear left sensor of the integrated vision module component 10, the third image sensor 122 may be the lower right sensor of the integrated vision module component 10, and the fourth image sensor 124 may be the rear right sensor of the integrated vision module component 10. The first binocular vision sensor may be the lower binocular vision sensor of the integrated vision module component 10, and the second binocular vision sensor may be the rear binocular vision sensor of the integrated vision module component 10.

As such, the integrated vision module component 10 composed of two sets of binocular vision sensors (i.e., the lower binocular vision sensor and the rear binocular vision sensor) can acquire image information from four visual directions, such as lower left, lower right, rear left, and rear right. Therefore, the acquired visual information may be more comprehensive and accurate, thereby improving the integration and miniaturization of the device.

More specifically, a lower left sensor and a lower right sensor may form a lower view image sensor (e.g., the lower binocular vision sensor), and a rear left sensor and a rear right sensor may form a rear view image sensor (e.g., the rear binocular vision sensor). When performing image processing, the images from the lower left and the lower right sensors can be processed to form a lower view image, and the images from the rear left and the rear right sensors can be processed to form a rear view image. When the integrated vision module component 10 is applied to the UAV 10, the lower view image and the rear view image can be used for, but not limited to, obstacle avoidance and terrain mapping of the UAV.

Referring to FIGS. 1-2. In some embodiments, the first vision module 11 may include a first lens 113 and a second lens 115 mounted on the bracket 14, the first image sensor 112 may be disposed in the first lens 113, and the second image sensor 114 may be disposed in the second lens 115. As such, the lenses and the image sensors may form a camera module, which can help the vision module to acquire the desired image.

More specifically, the first lens 113 may include a first lens glass 1131, a first lens barrel 1132, and a first lens holder 1133, where the first lens glass 1131 may be made of glass or plastic. In some embodiments, the first lens glass 1131 may be made of plastic, thereby reducing the cost and simplifying the manufacturing process. The number of the first lens glass 1131 can be one, two, two or more, or set based on the imaging requirement during design.

More specifically, the first lens glass 1131 may be disposed in the first lens barrel 1132, the first lens barrel 1132 may be connected to the first lens holder 1133, the first image sensor 112 may be disposed in the first lens holder 1133, and the first lens holder 1133 may be mounted on the bracket 14. For example, the first lens holder 1133 may be mounted on the bracket 14 by fixing methods such as screws, snaps, or welding. In the illustrated embodiment, the first lens holder 1133 is mounted on the bracket 14 by screwing. More specifically, two mounting portions 19 are disposed on the outer sidewall of the first lens holder 1133, and the first lens holder 1133 can be mounted on the bracket 14 through the mounting portions 19.

A first notch 1134 may be formed on one of the outer sidewalls of the first lens holder 1133, and the first flexible circuit board 111 may penetrate the first notch 1134. As such, the overall thickness of the first lens 113 can be reduced. In addition, the first lens barrel 1132 and the first lens holder 1133 can be made of plastic in one piece.

It should be noted that since the first image sensor 112 is disposed in the first lens holder 1133, the first image sensor 112 is not shown in FIG. 1 as it is blocked by the first lens holder 1133. Therefore, the position of the first image sensor shown as reference numeral "112" in FIG. 1 is an approximate position of the first image sensor 112. Those skilled in the art can clearly understand that the actual position of the first image sensor 112 in the integrated vision module component 10 based on the description herein. In addition, the reference numerals of other sensors can be understood in a similar fashion.

It can be understood that the second lens 115 has a similar structure to the first lens 113, therefore, the specific structure of the second lens 115 will not be described in detail here.

In some embodiments, the optical axis of the first lens 113 may be substantially perpendicular to the optical axis of the second lens 115. As such, the space occupied by the first lens 113 and the second lens 115 can be reduced, thereby reducing the space occupied by the integrated vision module component 10.

Referring to FIG. 1. In some embodiments, the first flexible circuit board 111 may include a first segment 1112 and a second segment 1114. The first image sensor 112 is mounted on the first segment 1112, the second image sensor 114 is mounted on the second segment 1114, and the first segment 1112 is substantially perpendicular to the second segment 1114. As such, the space occupied by the first flexible circuit board 111 can be reduced, and the first image sensor 112 and the second image sensor 114 used for different visions can be integrated, thereby realizing the integration and miniaturization needs when applying the integrated vision module component 10 to the electronic device.

More specifically, the first image sensor 112 and the second image sensor 114 can be fixed on the first segment 1112 and the second segment 1114 by gluing or welding. The first image sensor 112 and the second image sensor 114 may be both electrically connected to the first flexible circuit board 111. Of course, the fixing method is not limited to gluing or welding, and the appropriate method can be selected in actual implementation.

In some embodiments, the first flexible circuit board 111 may further include a third segment 1116, and the second segment 1114 may be connected to the first segment 1112 and the third segment 1116. The bracket 14 may include a body 142 and a lead-out portion 144, and the lead-out portion 144 may be connected to the upper portion of the body 142. The first image sensor 112, the second image sensor 114, the third image sensor 122, and the fourth image sensor 124 may be mounted on the body 142. A mounting groove 1442 may be disposed in the lead-out portion 144, and the third segment 1116 may be at least partially positioned in the mounting groove 1442. As such, the lead-out portion 144 can facilitate the first vision module 11 to be more conveniently mounted on the body 142, and facilitate the connection of the first flexible circuit board 111 to an external circuit or a main board of the UAV through the third segment 1116 for data transmission.

More specifically, in the illustrated embodiment, the lead-out portion 144 has a substantially inverted T-shape, and the third segment 1116 is partially embedded in the mounting groove 1442. As such, the first flexible circuit board 111 can be firmly mounted on the bracket 14, and the space utilization rate of the bracket 14 can be improved. The bracket 14 can protect the integrated vision module component 10, and the integrated vision module component 10 can be stably accommodated in the bracket 14. Therefore, the structural positions between the first image sensor 112, the second image sensor 114, the third image sensor 122, and the fourth image sensor 124 are clear, which is easy to produce and assemble.

In some embodiments, the bracket 14 may be made of metal or plastic. A suitable material can be selected when the bracket 14 is applied to an electronic device to meet the requirements of lightness and strength.

In some embodiments, a first connector 116 may be disposed at the end of the third segment 1116. As such, it is convenient for the first flexible circuit board 111 to be connected with an external circuit or a UAV main board.

More specifically, the first connector 116 can be used to connect to an external circuit or a UAV main board to transmit the image information acquired by the first vision module 11 to the external circuit or the UAV main board for processing (i.e., data transfer). At the same time, the first connector 116 can also be used to connect to a power source to power the first flexible circuit board 111, the first image sensor 112, and the second image sensor 114. The first connector 116 may also help to improve and simplify the production and assembly process of the integrated vision module component 10, and provide the advantage of easy maintenance, easy upgrade, and increased design flexibility.

In addition, a conductive foam 18 may be disposed on the first connector 116 to facilitate the connection of the first flexible circuit board 111 and other circuit boards or components. The martial of the conductive foam 18 may be light, with the advantages of long-term electrostatic protection performance, low surface impedance capability, no dependence on the humidity of the environment, good corrosion resistance and oxidation resistance.

Referring to FIGS. 1-2. In some embodiments, the second vision module 12 may include a third lens 123 and a fourth lens 125 mounted on the bracket 14. The third image sensor 122 may be disposed on the image side of the third lens 123, and the fourth image sensor 124 may be disposed on the image side of the fourth lens 125. As such, the lenses and the image sensors may form a camera module, which can help the vision module to acquire the desired image.

More specifically, the third lens 123 may include a third lens glass 1231, a third lens barrel 1232, and a third lens holder 1233, where the third lens glass 1231 may be made of glass or plastic. In some embodiments, the third lens glass 1231 may be made of plastic, thereby reducing the cost and simplifying the manufacturing process. The number of the third lens glass 1231 can be one, two, two or more, or set based on the imaging requirement during design.

The third lens glass 1231 may be disposed in the third lens barrel 1232, the third lens barrel 1232 may be connected to the third lens holder 1233, the third image sensor 122 may be disposed in the third lens holder 1233, and the third lens holder 1233 may be mounted on the bracket 14. For example, the third lens holder 1233 may be mounted on the bracket 14 by fixing methods such as screws, snaps, or welding. In the illustrated embodiment, the third lens holder 1233 is mounted on the bracket 14 by screwing. More specifically, two spaced apart mounting portions 19 are disposed on the outer sidewall of the third lens holder 1233, and the third lens holder 1233 can be mounted on the bracket 14 through the mounting portions 19.

A third notch 1234 may be formed on one of the outer sidewalls of the third lens holder 1233, and the second flexible circuit board 121 may penetrate the third notch 1234. As such, the overall thickness of the third lens 123 can be reduced. In addition, the third lens barrel 1232 and the third lens holder 1233 can be made of plastic in one piece.

It can be understood that the fourth lens 125 has a similar structure to the third lens 123, therefore, the specific structure of the fourth lens 125 will not be described in detail here.

In some embodiments, the optical axis of the third lens 123 may be substantially perpendicular to the optical axis of the fourth lens 125. As such, the space occupied by the third lens 123 and the fourth lens 125 can be reduced, thereby reducing the space occupied by the integrated vision module component 10.

In some embodiments, the second flexible circuit board 121 may include a fourth segment 1212 and a fifth segment 1214. The third image sensor 122 may be mounted on the fourth segment 1212, the fourth image sensor 124 may be mounted on the fifth segment 1214, and the fourth segment 1212 may be substantially perpendicular to the fifth segment 1214. As such, the space occupied by the second flexible circuit board 121 can be reduced, and the third image sensor 122 and the fourth image sensor 124 used for different visions can be integrated, thereby realizing the integration and miniaturization needs when applying the integrated vision module component 10 to the electronic device.

More specifically, the third image sensor 122 and the fourth image sensor 124 can be fixed on the fourth segment 1212 and the fifth segment 1214 by gluing or welding. The third image sensor 122 and the fourth image sensor 124 may be both electrically connected to the second flexible circuit board 121. Of course, the fixing method is not limited to gluing or welding, and the appropriate method can be selected in actual implementation.

Referring to FIGS. 1-2. In some embodiments, the second flexible circuit board 121 may further include a sixth segment 1216, and the fifth segment 1214 may be connected to the fourth segment 1212 and the sixth segment 1216.

The bracket 14 may include a body 142 and a lead-out portion 144, and the lead-out portion 144 may be connected to the upper portion of the body 142. The first image sensor 112, the second image sensor 114, the third image sensor 122, and the fourth image sensor 124 may be mounted on the body 142. A mounting groove 1442 may be disposed in the lead-out portion 144, and the sixth segment 1216 may be at least partially positioned in the mounting groove 1442. As such, the lead-out portion 144 can facilitate the second vision module 12 to be more conveniently mounted on the body 142, and facilitate the connection of the second flexible circuit board 121 to an external circuit or a main board of the UAV through the sixth segment 1216 for data transmission.

More specifically, in the illustrated embodiment, the lead-out portion 144 has a substantially inverted T-shape, and the sixth segment 1216 is partially embedded in the mounting groove 1442. As such, the second flexible circuit board 121 can be firmly mounted on the bracket 14, and the space utilization rate of the bracket 14 can be improved. The bracket 14 can protect the integrated vision module component 10, and the integrated vision module component 10 can be stably accommodated in the bracket 14. Therefore, the structural positions between the first image sensor 112, the second image sensor 114, the third image sensor 122, and the fourth image sensor 124 are clear, which is easy to produce and assemble.

In some embodiments, the bracket 14 may be made of metal or plastic. A suitable material can be selected when the bracket 14 is applied to an electronic device to meet the requirements of lightness and strength.

In some embodiments, a second connector 126 may be disposed at the end of the sixth segment 1216. As such, it is convenient for the second flexible circuit board 121 to be connected with an external circuit or a UAV main board.

More specifically, the second connector 126 can be used to connect to an external circuit or a main board of the UAV 100 to transmit the acquired image information to the external circuit or the main board of the UAV 100 for processing (i.e., data transfer). At the same time, the second connector 126 can also be used to connect to a power source to power the second flexible circuit board 121, the third image sensor 122, and the fourth image sensor 124. The second connector 126 may also help to improve and simplify the production and assembly process of the integrated vision module component 10, and provide the advantage of easy maintenance, easy upgrade, and increased design flexibility.

In addition, a conductive foam 18 may be disposed on the second connector 126 to facilitate the connection of the second flexible circuit board 121 and other circuit boards or components. The martial of the conductive foam 18 may be light, with the advantages of long-term electrostatic protection performance, low surface impedance capability, no dependence on the humidity of the environment, good corrosion resistance and oxidation resistance.

In some embodiments, the bracket 14 may include a body 142 and a lead-out portion 144, and the lead-out portion 144 may be connected to the upper portion of the body 142. The first image sensor 112, the second image sensor 114, the third image sensor 122, and the fourth image sensor 124 may be mounted on the body 142. A mounting groove 1442 may be disposed in the lead-out portion 144, and the first flexible circuit board 111 and the second flexible circuit board 121 may be at least partially positioned in the mounting groove 1442. The part of the first flexible circuit board 111 in the mounting groove 1442 and the part of the second flexible circuit board 121 in the mounting groove 1442 may be stacked.

As such, the first flexible circuit board 111 and the second flexible circuit board 121 can be partially stacked together, thereby reducing the space occupancy rate. In addition, the mounting groove 1442 can protect a part of the first flexible circuit board 111 and the second flexible circuit board 121. By stacking the first flexible circuit board 111 and the second flexible circuit board 121 together, the spaced used can be reduced, the strength of the first flexible circuit board 111 and the second flexible circuit board 121 can be enhanced, thereby expending their service life.

More specifically, in the illustrated embodiment, the position of the first flexible circuit board 111 in the mounting groove 1442 may be a part of the third segment 1116, and the position of the second flexible circuit board 121 in the mounting groove 1442 may be a part of the sixth segment 1216.

Referring to FIGS. 1-2. In some embodiments, the integrated vision module component 10 may include a time-of-flight (TOF) ranging module 13 and a third flexible circuit board 15. The TOF ranging module 13 may be mounted on the body 142, and the third flexible circuit board 15 may be connected to the TOF ranging module 13 and at least partially located in the mounting groove 1442. The third flexible circuit board 15 located in the mounting groove 1442 may be stacked on the second flexible circuit board 121 located in the mounting groove 1442 or the first flexible circuit board 111 located in the mounting groove 1442. Therefore, the integrated vision module component 10 can be integrated with more functions while maintaining the miniaturization of the integrated vision module component 10.

More specifically, the TOF ranging module 13 can be used to measure the distance between the electronic device with the integrated vision module component 10 and the obstacle, and cooperate with the image of the vision module to realize more functions.

The technology of the TOF ranging module 13 is mature, therefore, the ranging range is relatively large, and the accuracy and the update frequency are relatively high. As such, better ranging data can be acquired. The technology used by the TOF ranging module 13 may be a two-way ranging technology, which is to continuously send optical pulses to a target object. Subsequently, by using a sensor to receive the light returned from the target object, a target distance can be acquired by detecting the flight time of the light pulse.

By combining the TOF ranging module 13 and the integrated vision module component 10 enables the UAV 100 to achieve more accurate obstacle avoidance and mapping work. The multi-vision image acquisition of the integrated vision module component 10 mainly operates under ambient light to achieve distance measurement and acquire depth maps to realize the construction of the 3D model of the environment; while the TOF ranging module 13 can actively operate and transmit and receive acquired signals without relying on ambient light with high ranging accuracy. As such, the UAV 100 can effectively acquire image information in various situation.

In the illustrated embodiment, a part of the third flexible circuit board 15 located in the mounting groove 1442 is stacked on a part of the second flexible circuit board 121 located in the mounting groove 1442. That is, along the direction away from the mounting groove 1442, the third segment 1116, the sixth segment 1216, and the part of the third flexible circuit board 15 in the mounting groove 1442 are stacked in this order. In addition, the first flexible circuit board 111, the second flexible circuit board 121, and the third flexible circuit board 15 may be bonded together.

In some embodiments, the TOF ranging module 13 may include a main board 136, a transmitter 132, and a receiver 134. The transmitter 132 and the receiver 134 may be mounted on the main board 136 at intervals, and the transmitter 132 and the receiver 134 may be electrically connected to the main board 136. The main board 136 may be mounted on the body 142, and the transmitter 132 and the receiver 134 may be positioned between the first image sensor 112 and the third image sensor 122. As such, the setup is simple, the space occupancy rate of the integrated vision module component 10 can be reduced, and the first vision module 11, the second vision module 12, and the TOF ranging module 13 may be mounted on the body 142 through the flexible circuit board without interfering with each other.

More specifically, in the embodiments of the present disclosure, the body 142 may include a first board 1422 and a second board 1424, the first board 1422 being substantially perpendicularly connected to the second board 1424. The first segment 1112, the first image sensor 112, the first lens holder 1133, the fourth segment 1212, the third image sensor 122, and the third lens holder 1233 may be mounted on the first board 1422. The second segment 1114, the second image sensor 114, a lens holder of the second lens 115, the fifth segment 1214, the fourth image sensor 124, and the lends holder of the fourth lens 125 may be mounted on the second board 1424, and the lead-out portion 144 may be disposed on the upper portion of the second board 1424.

A body through hole 143 may be disposed on the first board 1422, and the main board 136 may be mounted at the body through hole 143. As such, the weight and thickness of the integrated vision module component 10 can be reduced, and the compactness of the integrated vision module component 10 can be ensured.

In some embodiments, a third connector 154 may be disposed at the end of the third flexible circuit board 15. As such, it is convenient for the third flexible circuit board 15 to be connected with an external circuit or a main board of the UAV 100 to transmit the acquired image information to the external circuit of the main board of the UAV 100 for processing (i.e., data transfer). At the same time, the third connector 154 can also be used to connect to a power source to power the TOF ranging module 13.

In addition, a conductive foam 18 may be disposed on the third connector 154 to facilitate the connection of the third flexible circuit board 15 and other circuit boards or components. The martial of the conductive foam 18 may be light, with the advantages of long-term electrostatic protection performance, low surface impedance capability, no dependence on the humidity of the environment, good corrosion resistance and oxidation resistance.

In the illustrated embodiment, the first connector 116 is disposed on the first flexible circuit board 111, the second connector 126 is disposed on the second connector 126, and the third connector 154 is disposed on the third flexible circuit board 15. One end of the first flexible circuit board 111 having the first connector 116, one end of the second flexible circuit board 121 having the second connector 126, and one end of the third flexible circuit board 15 having the third connector 154 may be at least partially stacked and bonded. As such, the first connector 116, the second connector 126, and the third connector 154 may be staggered, and the first flexible circuit board 111, the second flexible circuit board 121, and the third flexible circuit board 15 maybe bonded together. Therefore, it is convenient for the integrated vision module component 10 to be connected with other circuit boards or components, and the assembly efficiency can be improved.

In some embodiments, a control button 16 and an indicator light 17 may be disposed on the third flexible circuit board 15, the control button 16 and the indicator light 17 may be arranged at intervals. The indicator light 17 may be used to indicate the state of the electronic device to which the integrated vision module component 10 is applied. For example, when the electronic device is the UAV 100, the indicator light 17 may be used to indicate the flight state of the UAV 100. In some embodiments, the indicator light 17 may be an LED.

In some embodiments, a first positioning structure 152 may be disposed on the third flexible circuit board 15, and a second positioning structure 1444 may be disposed on the lead-out portion 144. The first positioning structure 152 and the second positioning structure 1444 may be cooperatively connected to jointly position the indicator light 17 at a predetermined position of the bracket 14. As such, the positioning structures can ensure that the mounting of the indicator light is just opposite to a light cover 25 of the housing of the electronic device. For example, the light cover 25 of the body 20 of the UAV 100.

More specifically, in the illustrated embodiment, the first positioning structure 152 includes two grooves, the second positioning structure 1444 includes two protrusions, and each protrusion is caught in a corresponding groove to position the indicator light 17 to be mounted at the predetermined position of the bracket 14.

Figure 3:
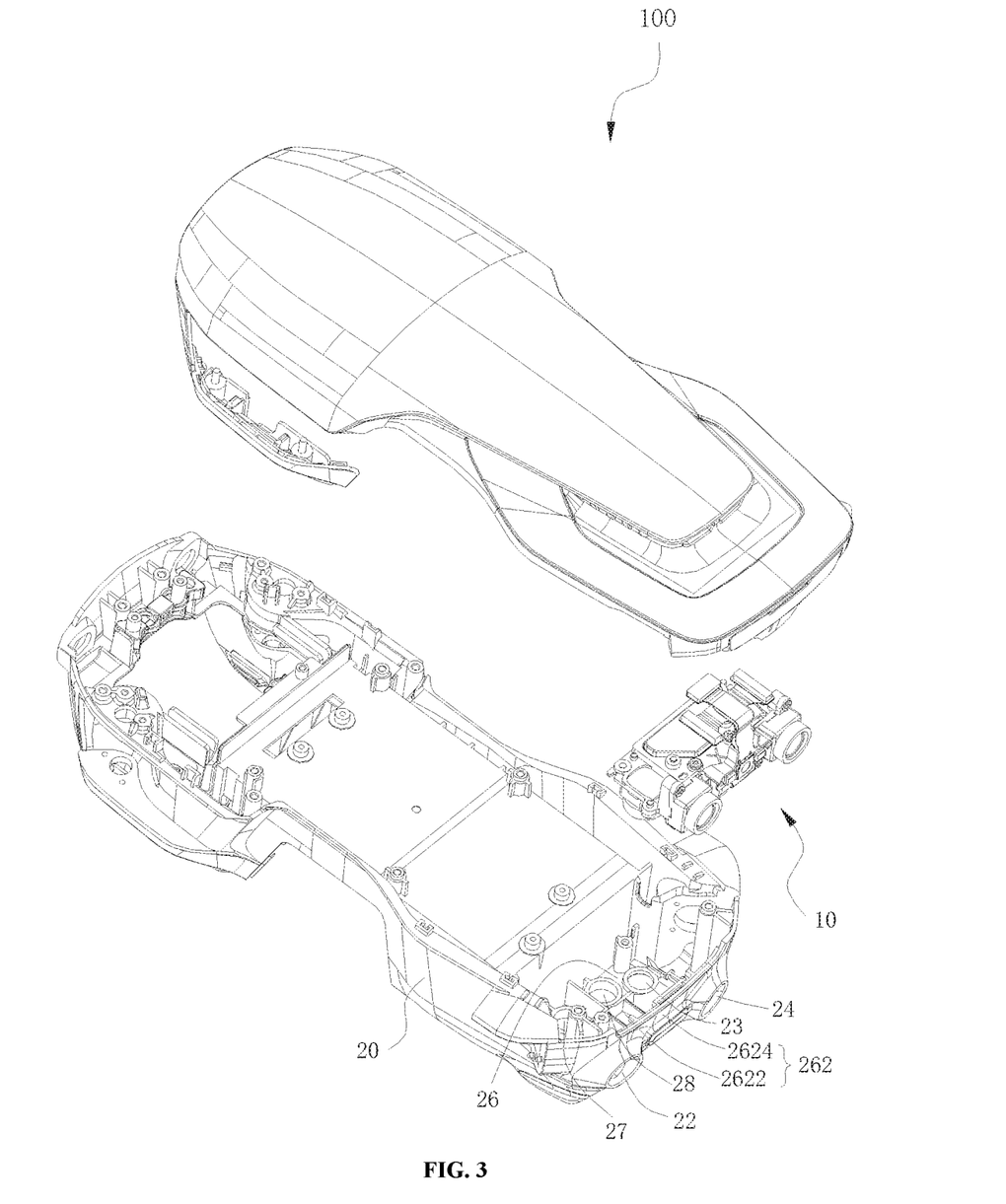
FIG. 3 is a partial exploded view of a UAV according to an embodiment of the present disclosure.
Figure 4:
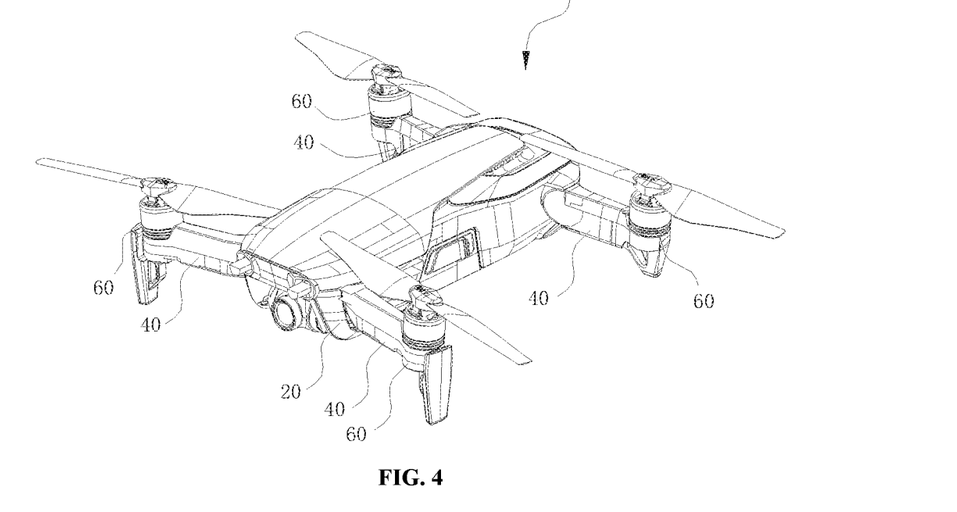
FIG. 4 is a perspective view of the UAV according to an embodiment of the present disclosure.
Figure 5:
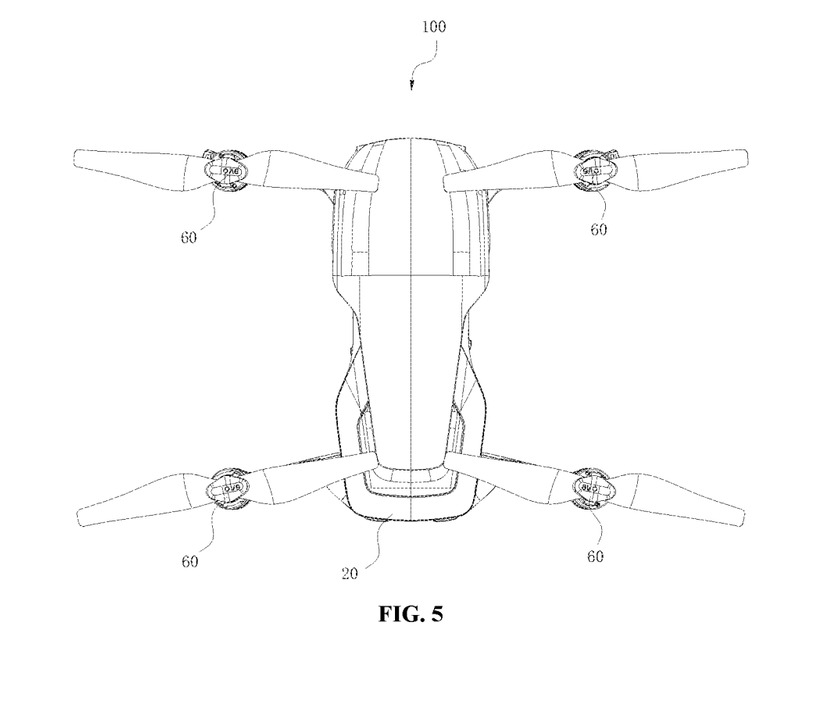
FIG. 5 is a plan view of the UAV according to an embodiment of the present disclosure.

Referring to FIG. 3. A UAV 100 according to an embodiment of the present disclosure includes a body 20, and the integrated vision module component 10 of any of the foregoing embodiments. The integrated vision module component 10 is mounted on the body 20.

In the UAV 100 described above, the first vision module 11 and the second vision module 12 may be integrated through the bracket 14. As such, when the integrated vision module component 10 is mounted on the UAV 100, a multi-directional vision module can be mounted on the UAV 100. In addition, the space occupied by the integrated vision module component 10 in the UAV 100 may be reduced, the structural design of the UAV 100 may be simplified, and the assembly may be relatively simple and reliable.

More specifically, the integrated vision module component 10 can be fixed to the body by screwing. As such, the connection between the integrated vision module component 10 and the UAV 100 is stable. The body 20 and a receiving groove 26 can ensure the stability and operation safety of the integrated vision module component 10, the structure of the UAV 100 is clear, which is convenient for production and assembly, and can reduce cost.

In this embodiment, the integrated vision module component 10 is mounted at the rear of the body 20 to acquire the rear and bottom images of the UAV 100. In addition, referring to FIGS. 4-8, the UAV 100 may further include an arm 40 and a power assembly 60. In some embodiments, the arm 40 may be connected to the body 20, and the power assembly 60 may be disposed on the arm 40. The arm 40 can be rotatably connected to the body 20, such that when the UAV is not in use, the arm 40 can be folded into the body 20, thereby reducing the volume of the UAV 100, which convenient for transportation and storage. When the UAV 100 is in use, the arm 40 can be deployed to prepare for flight.

Figure 6:
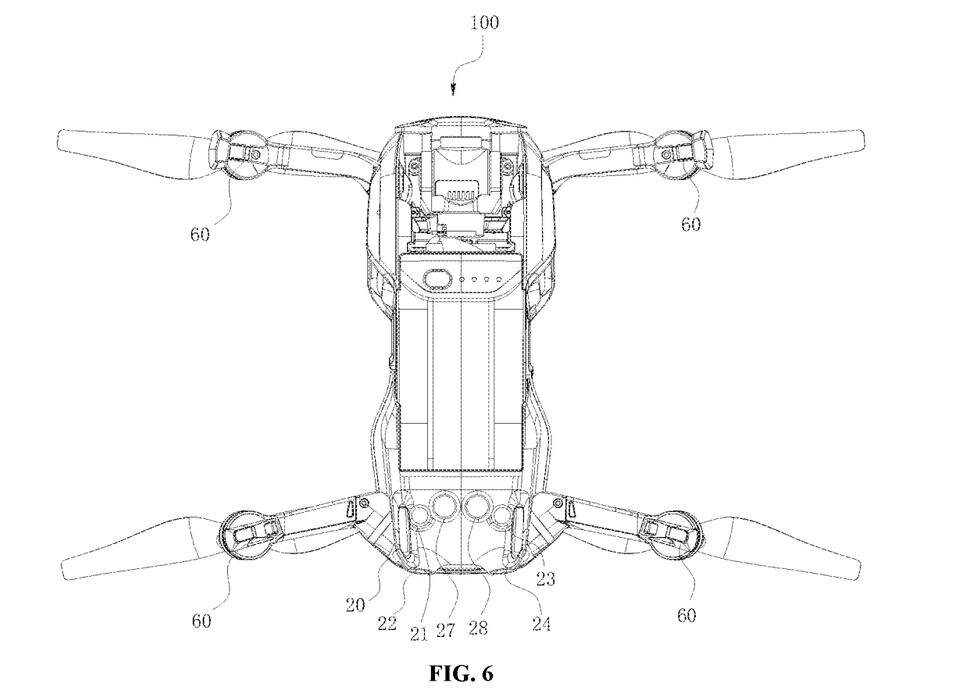
FIG. 6 is another plan view of the UAV according to an embodiment of the present disclosure.
Figure 7:
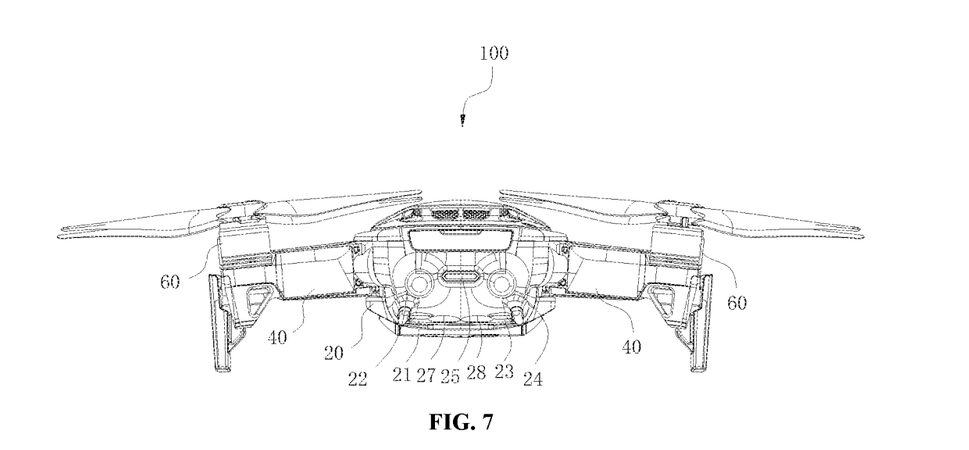
FIG. 7 is yet another plan view of the UAV according to an embodiment of the present disclosure.
Figure 8:
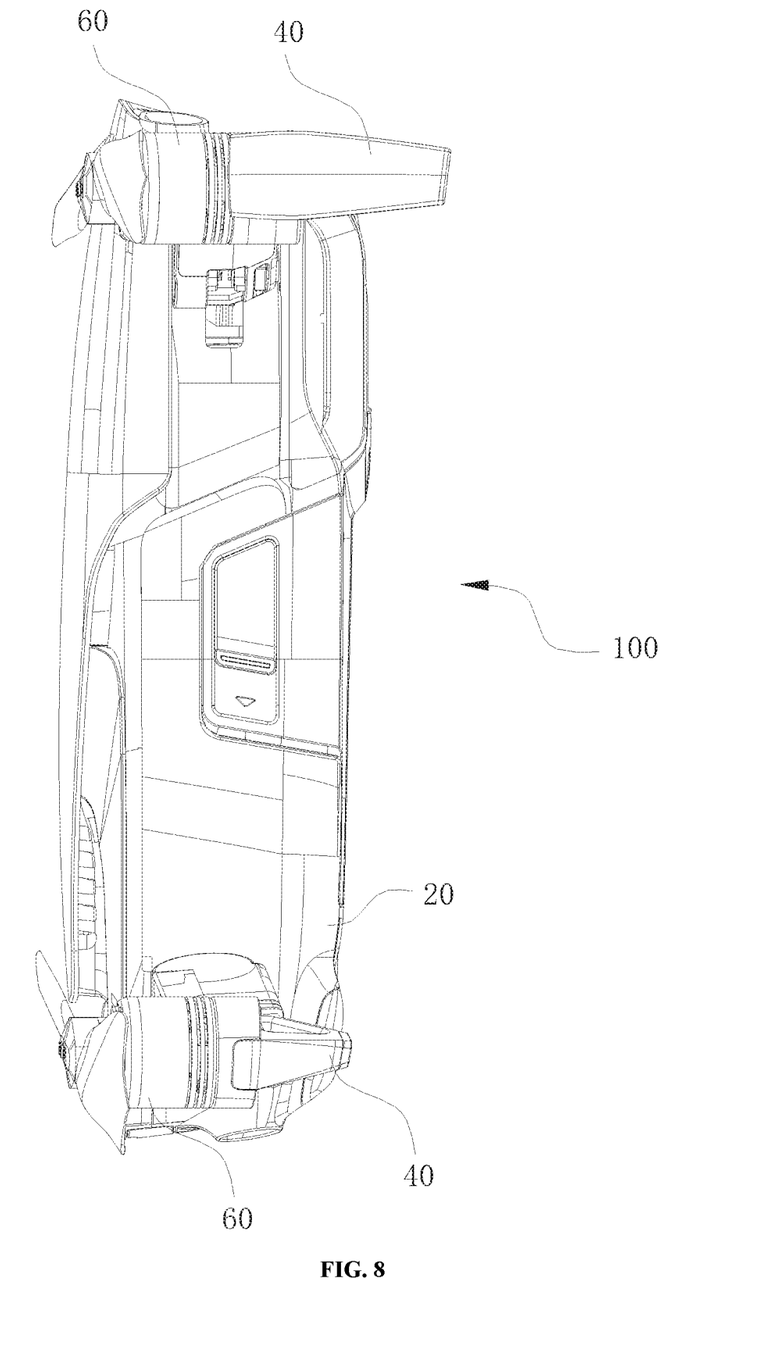
FIG. 8 is still another plan view of the UAV according to an embodiment of the present disclosure.

Referring to FIGS. 3, 6, and 7. In some embodiments, a receiving groove 26 may be disposed in the body 20, and the integrated vision module component 10 may be mounted in the receiving groove 26. A first through hole 21, a second through hole 22, a third through hole 23, and a fourth through hole 24 may be disposed on a sidewall 262 of the receiving groove 26. The first image sensor 112 may be arranged to correspond with the first through hole 21, the second flexible circuit board 121 may be arranged to correspond with the second through hole 22, the third image sensor 122 may be arranged to correspond with the third through hole 23, and the fourth image sensor 124 may be arranged to correspond with the fourth through hole 24.

As such, the integrated vision module component 10 can be conveniently mounted at a predetermined position of the body 20. At the same time, arranging four through holes as oppose to arranging one or two relatively large through holes can ensure the structural strength of the body 20 while ensuring that the integrated vision module component 10 can acquire external images.

More specifically, in this embodiment, the sidewall 262 of the receiving groove 26 may include a lower sidewall 2622 and a rear sidewall 2624. The first through hole 21 and the third through hole 23 may be disposed on the lower sidewall 2622, and the second through hole 22 and the fourth through hole 24 may be disposed on the rear sidewall 2624.

In the illustrated embodiment, a fifth through hole 27 and a sixth through hole 28 are disposed on the lower sidewall 2622. The fifth through hole 27 may be arranged to correspond with the transmitter 132, and the sixth through hole 28 may be arranged to correspond with the receiver 134. As such, the information transmission effect of the transmitter 132 and the receiver 143 can be ensured, and the space utilization rate of the body can be improved.

A person having ordinary skill in the art can appreciate that when the description mentions "certain embodiments," "an embodiment," "one embodiment," "some embodiments," "illustrative embodiment," "an example," "a specific example," or "some examples," it means that characteristics, structures, or features related to the embodiment or example are included in at least one embodiment or example of the present disclosure. Thus, when the description uses these or similar terms, it does not necessarily mean the same embodiment or example. Various characteristics, structures, or features of various embodiments may be combined in a suitable manner. Various characteristics, structures, or features of one embodiment may be incorporated in another embodiment.

The above descriptions of various embodiments of the present disclosure are illustrative, and do not limit the scope of the present disclosure. A person having ordinary skills in the art can make changes, modifications, substitutions, and variations based on the present disclosure. The scope of the present disclosure is defined by the following claims and the equivalents.

What is claimed is:

1. An integrated vision module component, comprising:
   a bracket;
   a first vision module;
   a second vision module;
   wherein:
   the bracket includes a body and a lead-out portion, the lead-out portion being connected to an upper portion of the body;
   the first vision module and the second vision module are mounted on the bracket; the first vision module includes:
   a first lens and a second lens mounted on the bracket;
   a first flexible circuit board including a first segment, a second segment substantially perpendicular to the first segment, and a third segment, the second segment connecting the first segment and the third segment;
   a first image sensor mounted on the first segment and disposed on an image side of the first lens; and
   a second image sensor mounted on the second segment and disposed on an image side of the second lens;
   the second vision module includes a second flexible circuit board, and a third image sensor and a fourth image sensor mounted on the second flexible circuit board;
   the first image sensor and the third image sensor form a first binocular vision sensor;
   the second image sensor and the fourth image sensor form a second binocular vision sensor;
   the first image sensor, the second image sensor, the third image sensor, and the fourth image sensor are mounted on the body;
   a mounting groove is disposed on the lead-out portion, and the third segment of the first flexible circuit and the second flexible circuit board are at least partially located in the mounting groove; and
   the part of the third segment of the first flexible circuit located in the mounting groove and the part of the second flexible circuit board located in the mounting groove are stacked.

2. The integrated vision module component of claim 1, wherein:
   the first image sensor is a lower left sensor of the integrated vision module component;
   the second image sensor is a rear left sensor of the integrated vision module component;
   the third image sensor is a lower right sensor of the integrated vision module component;
   the fourth image sensor is a rear right sensor of the integrated vision module component;
   the first binocular vision sensor is a lower binocular vision sensor of the integrated vision module component; and
   the second binocular vision sensor is a rear binocular vision sensor of the integrated vision module component.

3. The integrated vision module component of claim 1, wherein: an optical axis of the first lens is substantially perpendicular to an optical axis of the second lens.

4. The integrated vision module component of claim 1, wherein: a first connector is disposed at an end of the third segment.

5. The integrated vision module component of claim 1, wherein: the second vision module includes a third lens and a fourth lens mounted on the bracket; the third image sensor is disposed on an image side of the third lens, and the fourth image sensor is disposed on an image side of the fourth lens.

6. The integrated vision module component of claim 5, wherein: an optical axis of the third lens is substantially perpendicular to an optical axis of the fourth lens.

7. The integrated vision module component of claim 5, wherein: the second flexible circuit board includes a fourth segment and a fifth segment; and the third image sensor is mounted on the fourth segment, the fourth image sensor is mounted on the fifth segment, and the fourth segment is substantially perpendicular to the fifth segment.

8. The integrated vision module component of claim 7, wherein:
the second flexible circuit board includes a sixth segment, and the fifth segment connects the fourth segment and the sixth segment; and
the sixth segment is at least partially located in the mounting groove.

9. The integrated vision module component of claim 8, wherein: a second connector is disposed at an end of the sixth segment.

10. The integrated vision module component of claim 1, further comprising:
a time-of-flight (TOF) ranging module disposed on the body; and
a third flexible circuit board connected to the TOF ranging module and at least partially located in the mounting groove;
wherein a part of the third flexible circuit board located in the mounting groove is stacked on the part of the second flexible circuit board located in the mounting groove or the first flexible circuit board located in the mounting groove.

11. The integrated vision module component of claim 10, wherein:
the TOF ranging module includes a main board, a transmitter, and a receiver; and the transmitter and the receiver are mounted on the main board at intervals, the main board is mounted on the body, and the transmitter and the receiver are positioned between the first image sensor and the third image sensor.

12. The integrated vision module component of claim 10, wherein: a third connector is disposed at an end of the third flexible circuit board away from the body.

13. The integrated vision module component of claim 10, wherein: a control button and an indicator light are disposed on the third flexible circuit board, and the control button and the indicator light are disposed at intervals.

14. The integrated vision module component of claim 13, wherein: a first positioning structure is disposed on the third flexible circuit board, a second positioning structure is disposed on the lead-out portion, and the first position structure is cooperatively connected to the second positioning structure to jointly position the indicator light at a position of the bracket.

15. An unmanned aerial vehicle (UAV) comprising:
a vehicle body; and
an integrated vision module component mounted on the vehicle body, the integrated vision module component including a bracket, a first vision module, and a second vision module;
wherein:
the bracket includes a body and a lead-out portion, the lead-out portion being connected to an upper portion of the body;
the first vision module and the second vision module are mounted on the bracket;
the first vision module includes:
a first lens and a second lens mounted on the bracket;
a first flexible circuit board including a first segment, a second segment substantially perpendicular to the first segment, and a third segment, the second segment connecting the first segment and the third segment;
a first image sensor mounted on the first segment and disposed on an image side of the first lens; and
a second image sensor mounted on the second segment and disposed on an image side of the second lens;
the second vision module includes a second flexible circuit board, and a third image sensor and a fourth image sensor mounted on the second flexible circuit board;
the first image sensor and the third image sensor form a first binocular vision sensor;
the second image sensor and the fourth image sensor form a second binocular vision sensor;
the first image sensor, the second image sensor, the third image sensor, and the fourth image sensor are mounted on the body;
a mounting groove is disposed on the lead-out portion, and the third segment of the first flexible circuit and the second flexible circuit board are at least partially located in the mounting groove; and
the part of the third segment of the first flexible circuit located in the mounting groove and the part of the second flexible circuit board located in the mounting groove are stacked.

16. The UAV of claim 15, wherein:
the first image sensor is a lower left sensor of the integrated vision module component;
the second image sensor is a rear left sensor of the integrated vision module component;
the third image sensor is a lower right sensor of the integrated vision module component;
the fourth image sensor is a rear right sensor of the integrated vision module component;
the first binocular vision sensor is a lower binocular vision sensor of the integrated vision module component; and
the second binocular vision sensor is a rear binocular vision sensor of the integrated vision module component.

* * * * *